INVENTORS
FRANCIS L. STRUBEN
PAUL M. PLOWMAN
BY Walter G. Finch
ATTORNEY

FRANCIS L. STRUBEN
PAUL M. PLOWMAN
INVENTORS

BY Walter G. Finch
ATTORNEY

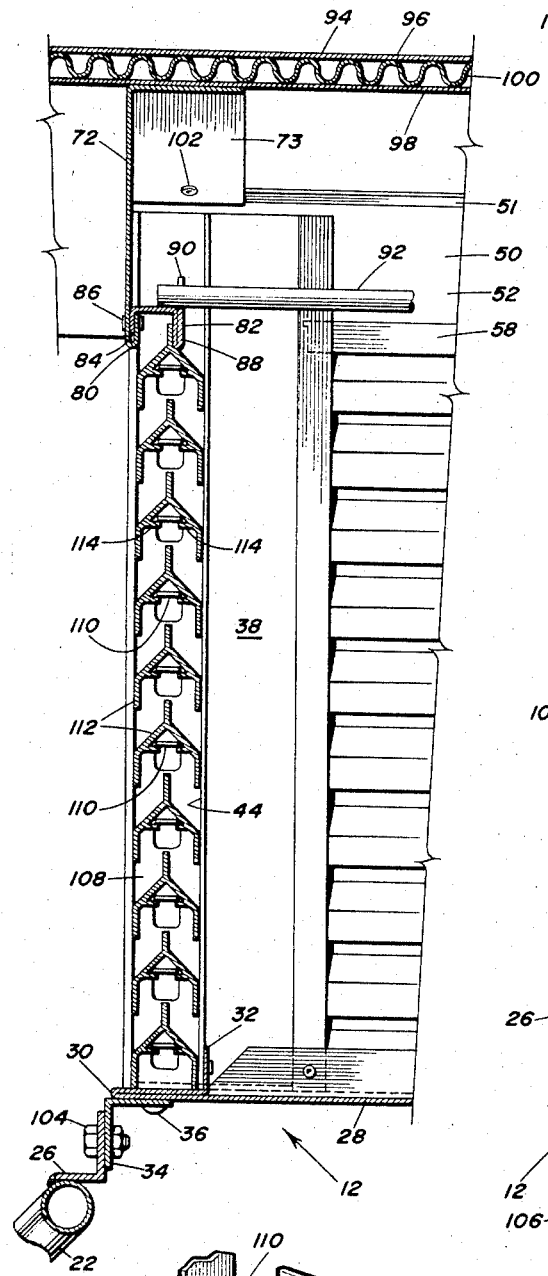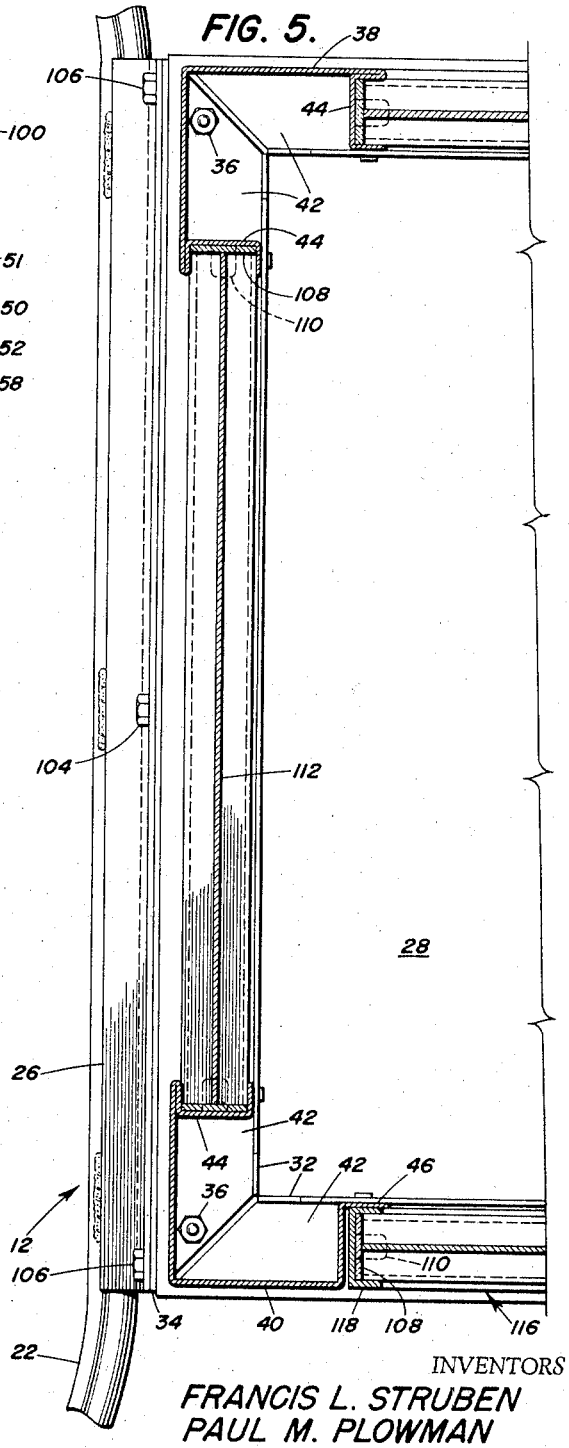

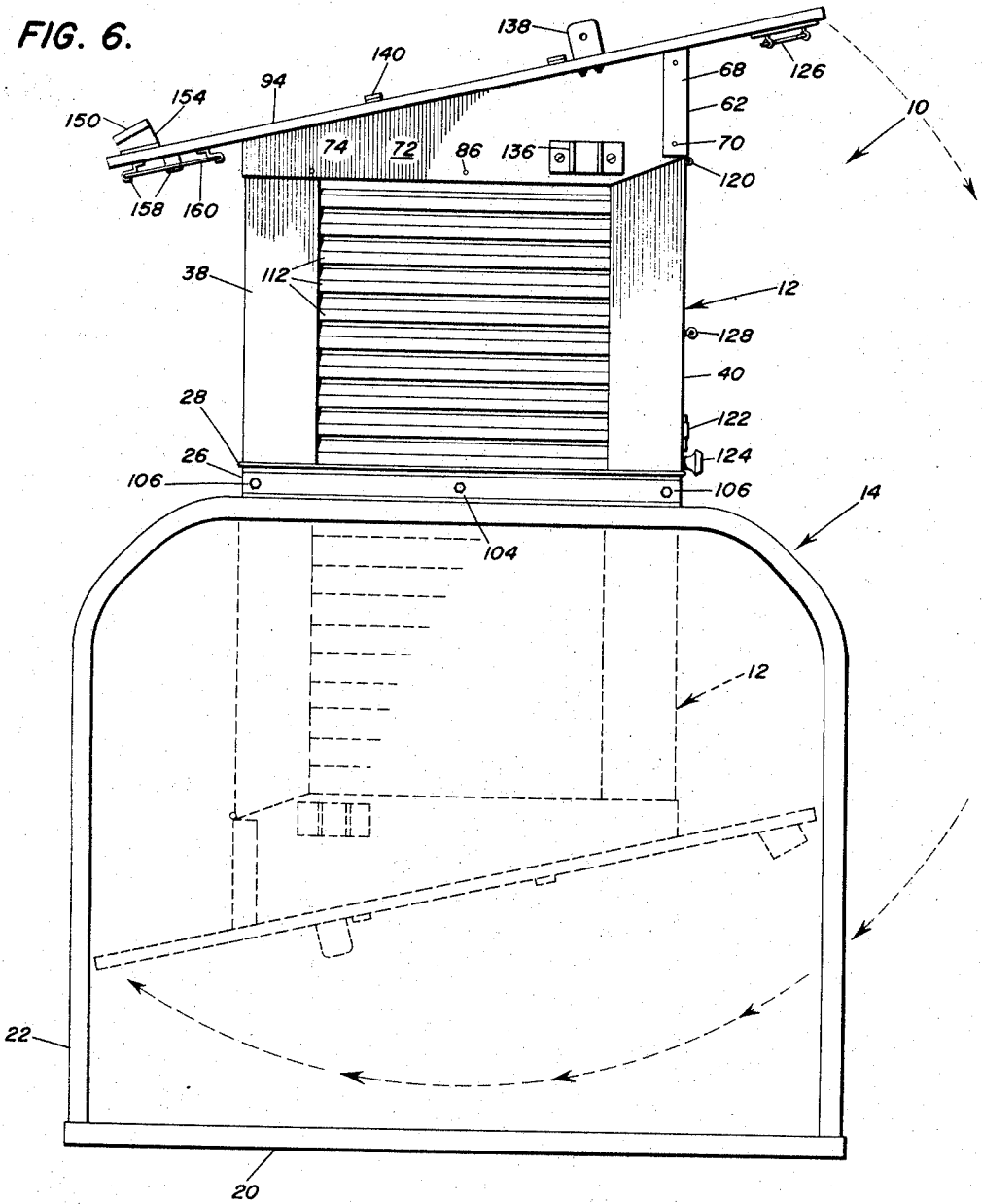

United States Patent Office 3,426,591
Patented Feb. 11, 1969

3,426,591
PORTABLE TEST APPARATUS FOR DETERMINING EFFECTS OF ATMOSPHERIC POLLUTION
Francis L. Struben, Baltimore, and Paul M. Plowman, Baldwin, Md., assignors to Silver-Top Manufacturing Company, Inc., White Marsh, Md., a corporation of Maryland
Filed Oct. 28, 1966, Ser. No. 590,416
U.S. Cl. 73—170
Int. Cl. G01w 1/00
10 Claims

ABSTRACT OF THE DISCLOSURE

An effects package is described for standardized environmental exposure of test devices. A light-tight, air permeable housing is provided upon a wide-spreading leg stand and pivotably arranged to be inverted and depended between the legs thereof for portability. In the erected position the wide-spreading sloping roof includes a rack of slide mounts which carry fabric samples for exposure.

Another roof-mounted element is a transverse bar with provisions for mounting metallic test specimens. The eaves portion incorporates a mounted plate of silver which reacts to hydrogen sulphide in the atmosphere but is protected from rain wash. A rack within the housing exposes specimens in the absence of sunlight. Side brackets extending upwardly carry a dust fall collector and a lead peroxide candle in a measure of isolation.

---

This invention relates generally to a testing apparatus, and more particularly it pertains to a portable test stand for determining the effect of atmosphere pollution under standardized conditions.

Health agencies have become very concerned lately by the severe pollution of our atmosphere especially around industrial areas, but have had no standardized test equipment to achieve a realistic estimate of the economic impact of a polluted atmosphere. This requires the measurement of a variety of factors. For field operations, it is desirable to employ an evaluating package which can be easily carried about and set up at selected exposure sites. Such packages can be compared with other packages at rural sites free from contaminated atmosphere which thus serve as "controls."

Accordingly, it is an object of this invention to provide an effects package for evaluating atmospheric pollution in a standardized manner.

Another object of the invention is to provide a folding test stand for field use which can be handled easily and carried up ladders or fire escapes to rooftop areas and erected in a minimum of time.

Yet another object of this invention is to provide an environment testing facility which directly assesses the qualitative effect of air pollution in a manner whereby one facility may be used as a control for another with confidence.

Other objects and attendant advantages of this invention will become more readily apparent and understood from the following detailed specification and accompanying drawings in which.

Figure 1:
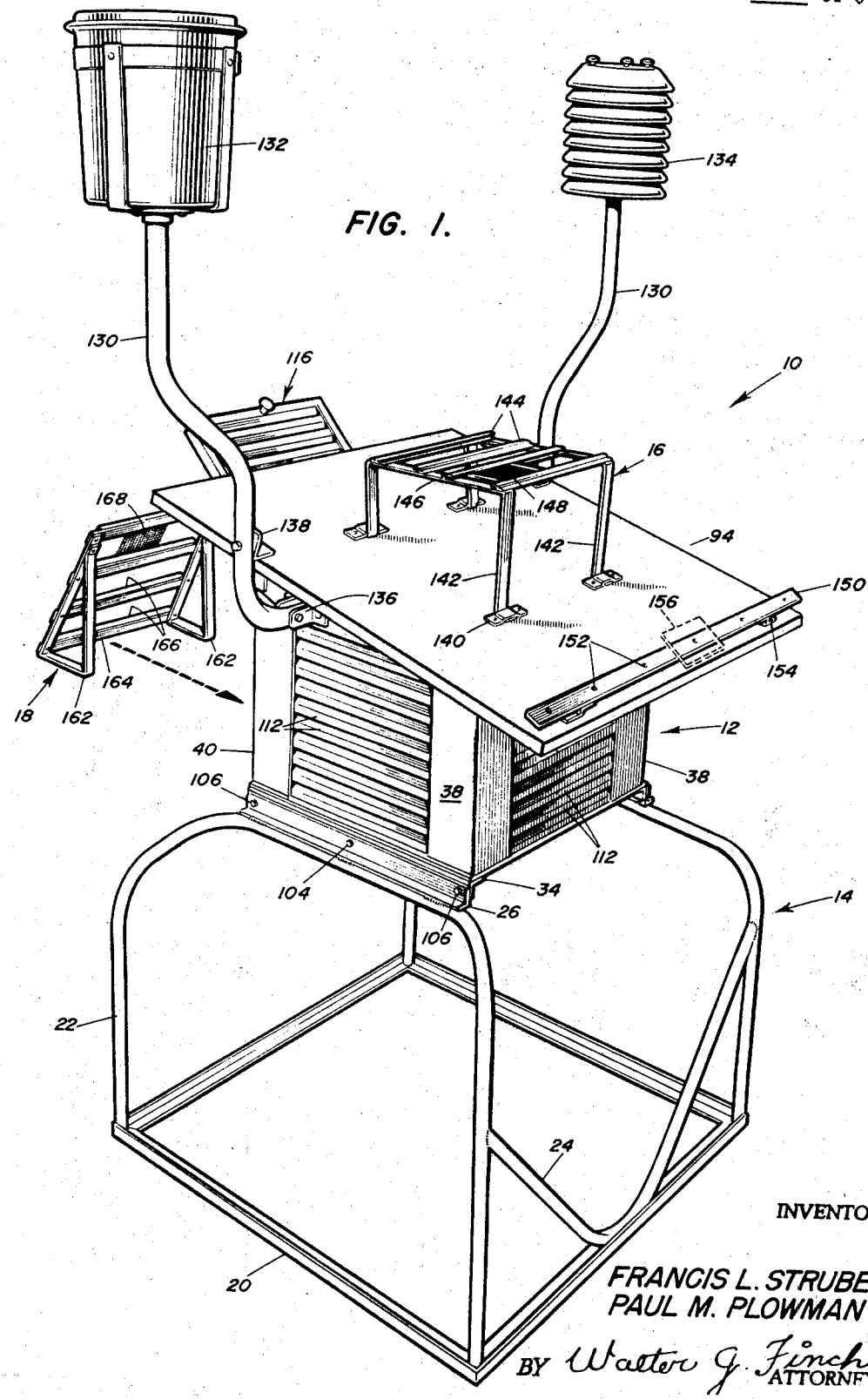
FIG. 1 is a perspective view of a portable test apparatus in the form of an effects package for determining the effects of atmospheric pollution incorporating features of this invention.
Figure 2:
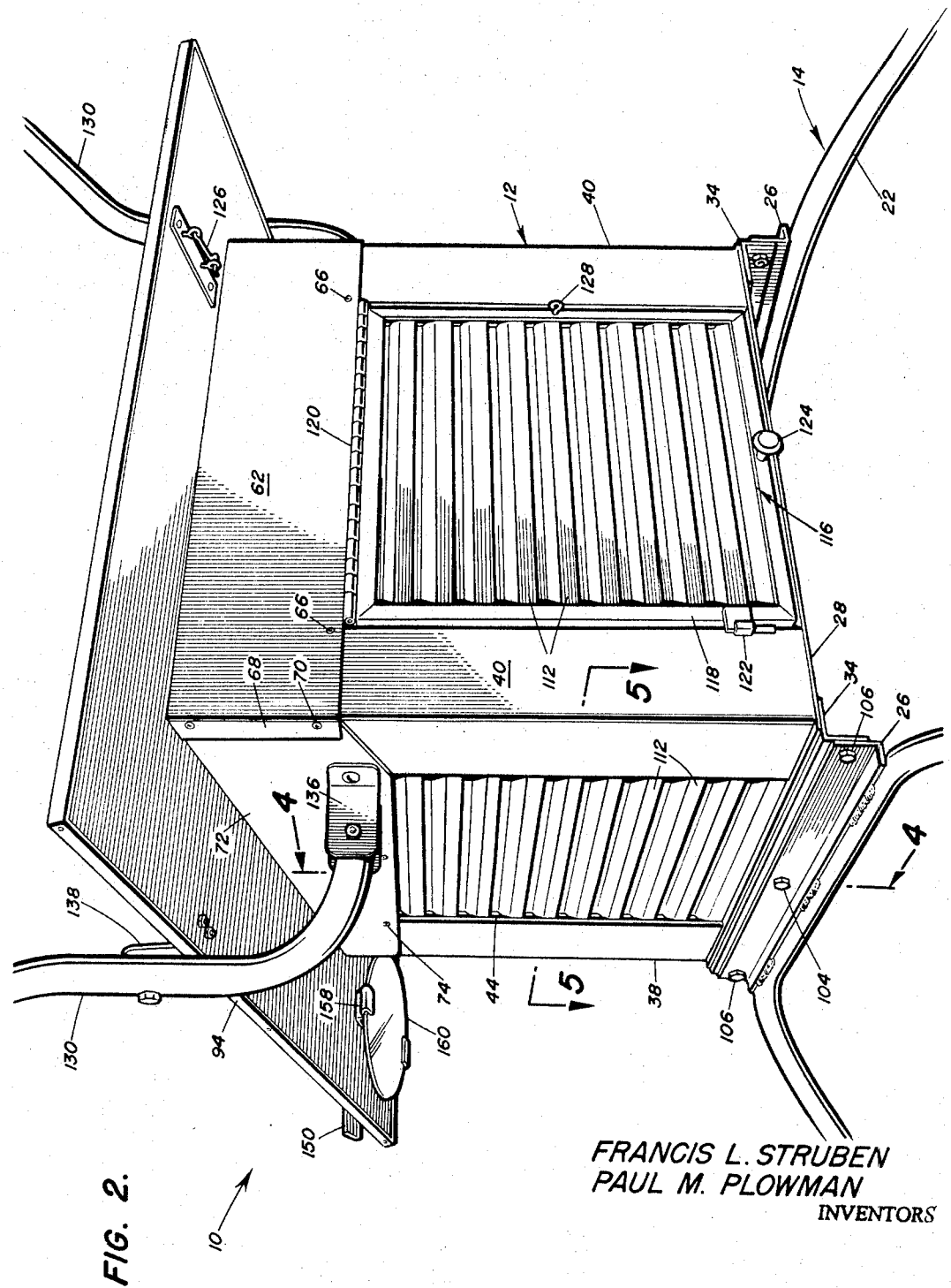
FIG. 2 is a perspective detail view of the enclosure portion of the apparatus of FIG. 1 as seen from the opposite side.
Figure 7:
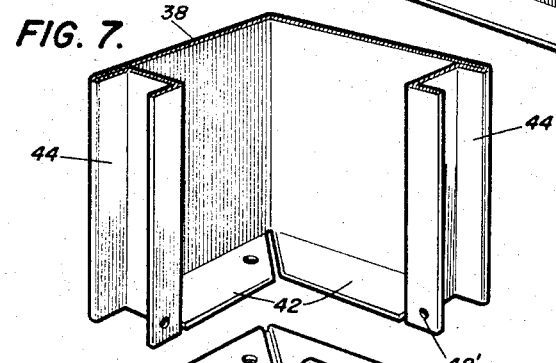

FIG. 4 is a section view taken on line 4—4 of FIG. 2;
FIG. 5 is a section view taken on line 5—5 of FIG. 2;
FIG. 6 is a side elevation of the portable test apparatus of FIG. 1 depicting the method of collapsing the structure for portability;
FIG. 7 is an exploded detail view of the corner of the enclosure; and
FIG. 8 is a fragmentary detail view of the baffle structure of the enclosure.

Referring now to the details of the invention as shown in FIG. 1, reference numeral 10 indicates generally a portable test apparatus in the form of an effects package for evaluating atmospheric pollution. This effects package 10 comprises a light-tight but air permeable enclosure 12 mounted upon a supporting structure 14. Inverted U-shaped legs 22 of tubing stock are welded to a rectangular base frame 20 and braced with diagonal bracing 24. Further, the upper portions of the legs 22 are bent inwardly toward each other for a purpose to be related and making the supporting structure 14 very open, light in weight, and rigid. As shown best in FIGS. 1 and 2, mounting angles 26 are welded to the legs 22 for mounting the enclosure 12.

Figure 3:
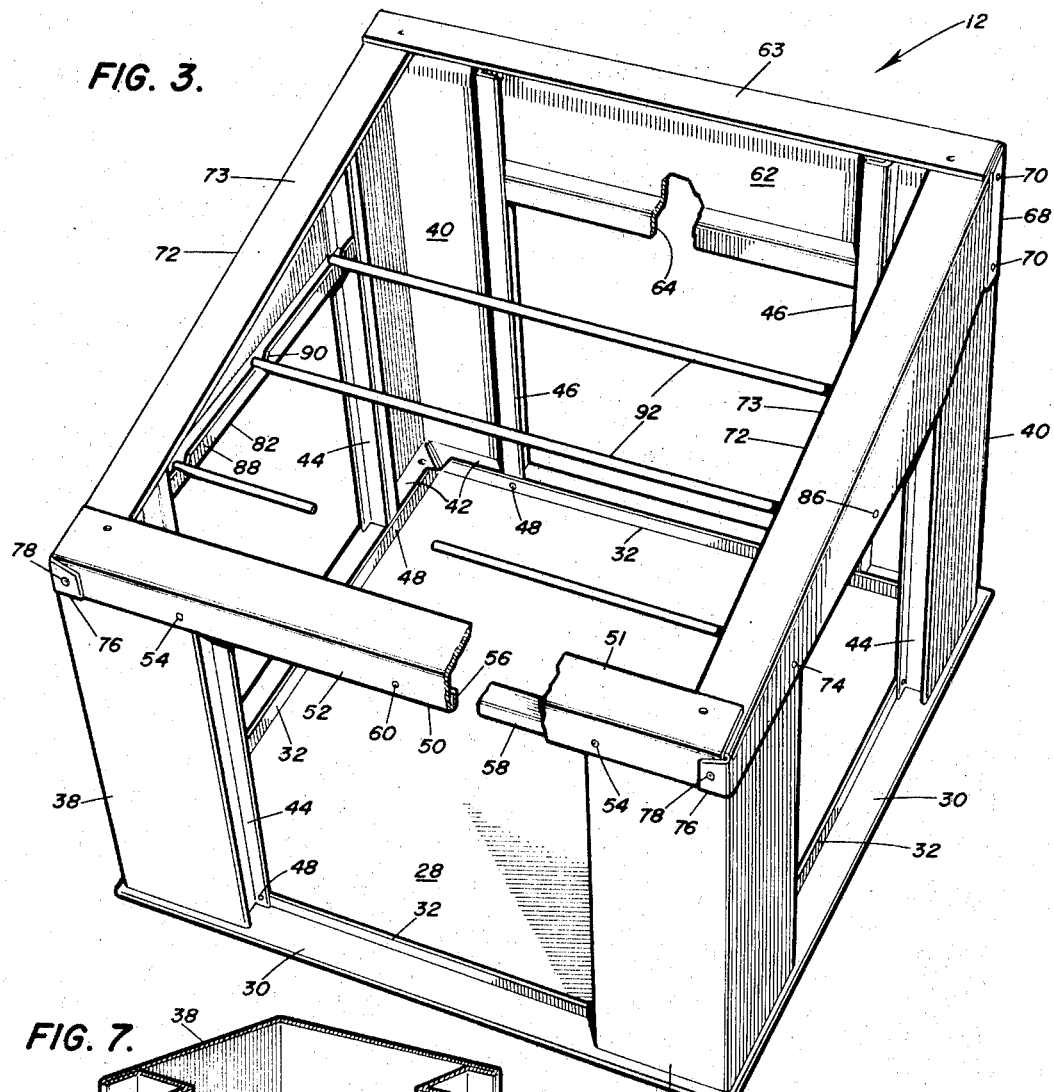
FIG. 3 illustrates in perspective the constructional details of the enclosure portion.

This enclosure 12 consists of a rectangular floor 28 having doubled edges 30 on the four sides thereof as best shown in FIGS. 3 and 7. These edges 30 are formed up with inwardly-set upright flanges 32, and are also drilled for fasteners 36 which secure depending supporting angles 34 as depicted in FIGS. 4 and 5.

The front and rear corner members 38 and 40, respectively, are each formed with a base flange 42 by which the fasteners 36 secure them to the floor 28. Vertical channels 44 are reentrantly formed along the sides of the corner members 38 and 40 except that one side of the latter pair have only a single flange 46 to provide a door opening.

With reference to FIGS. 3 and 7, rivets 48 in holes 48' secure the corner members 38 and 40 to the upright flanges 32 of the floor 28 for added strength.

A front fascia 50 extends across the top ends of corner members 38 to which it is secured by rivets 54. It is formed with an upper flange 51 and an outer vertical flange 52. This outer flange 52 has a reverse-formed inner flange 56 to receive one side of an inverted channel 58 which is then secured by rivet 60.

A rear fascia 62 extends between the upper ends of corner members 40 and is formed with an upper flange 63. An inwardly extending angular flange 64 on its lower edge forms the top portion of a door opening. Rivets 66 fasten the fascia 62 to the leg members 40, as shown in FIG. 2. Other rivets 70 in its side flanges 68 additionally secure a pair of side fascia 72.

These side fascia 72 are cut at an angle to accommodate a sloping roof or lid 94. They also are formed with a top flange 73. At their front ends, the side fascia 72 are provided with right angle tabs 76 which extend over the ends of the front fascia 50 and there secured with rivets 78. A rivet 74 through each side fascia 72 secures it to its respective front corner member 38.

A portion of the lower edge of each side fascia 72 is formed with a reverse flange 80 as best shown in FIG. 4. This flange 80 receives an outer flange 84 of a rod support 82 which is there secured by rivet 86. The inner flange 88 of this channel-like support 82 is doubled back on itself and extends upwardly a small amount. V-notches 90 are cut in this extension and serve to support the ends of rods 92 extending across the upper portion inside enclosure 12.

The roof or lid 94 is an insulating sandwich construction comprising a core of corrugated material 100 between an upper panel 96 and a lower panel 98 as shown in FIG. 4. Rivets 102 secured the lid 94 to top flanges 73 of the enclosure 12.

The enclosure 12, on three sides, is provided with air permeable assemblies comprising a plurality of light baffles 112. These baffles 112 are of inverted Y shaped cross section which extend betwen pairs of side or spacer bars 108 which hold them in interleaved groups. For this purpose spaced tabs 110 are lanced out from the bars 108 which cooperate with inner flanges 114 in the baffles 112 to retain the latter in position as shown best in FIGS. 4, 5, and 8.

The complete baffle assemblies are retained within the previously mentioned channels 44 of the corner members 38 and 40.

The door assembly 116, as best shown in FIG. 2, is similarly constructed using framing channel members 118. The door assembly 116 is secured by a piano hinge 120 at the top to fascia 62 and has a latch 122 to retain it within the door opening comprising the previously recited flanges 44 of the rear corner members 40. When the door 116 is opened by means of a knob 124, it is conveniently held open by means of a hook 126 beneath the lid 94 and an eye 128.

A dust fall collector 132 and a lead peroxide candle assembly 134 (for sulphate determination) are individually supported above the lid 94 by tubular columns 130. These columns 130 are secured to the lid 94 by brackets 138 and to the sides of enclosure 12 by other brackets 136 as shown in FIGS. 1 and 2.

A roof rack 16 is mounted in clips 140 on the center of lid 94 and has unequal legs 142 to horizontally support slotted tracks 144. These tracks 144 retain slide mounts or plastic frames 146 carrying fabric samples 148 such as woven nylon for exposure to the atmosphere. Near the lower edge of the roof or lid 94, a transverse bar 150 having threaded holes 152 is mounted on pedestals 154 for the purpose of exposing test specimens 156 such as bar metal zinc, copper or steel plates. By the weight loss or change of light reflectance of the specimens 156, the effect of the atmosphere on the specimen 156 is determined.

The underside of lid 94 as shown in FIG. 2 is provided with clips 158 to hold a silver plate 160. This plate 160 will tarnish from hydrogen sulphide in the atmosphere and is a useful test device.

In addition to the previously mentioned rods 92 on which sample items of painted articles and the like may be hung, the inside of enclosure 12 has a removable rack 18 shown in FIG. 1. This rack 18 has a pair of triangular end frames 162 spaced by cross members 164 of soft material such as Homosote bars. Dyed fabric samples 168 of various representative kinds are pinned to these cross members 164 for evaluating the deteriorative effect of atmosphere in the absence of sunlight.

When it is necessary to move the test station 10 to a new site, the supports 130 are first removed. Then the four end bolts 106 are taken out and the entire upper structure of enclosure 12 is rotated about the two center or pivot bolts 104, as shown by the dashed lines of FIG. 6, to depend between the legs 22 of the supporting structure 14.

This brings the center of gravity down and forms a compact portable package which will easily fit in a station wagon.

Because, as previously mentioned, the upper portions of the pairs of legs 22 are bent toward each other, there is sufficient room below to accommodate even a wide spreading roof or lid 94 and to protect it from damage during transport.

Obviously many modifications and variations of the present invention are possible in light of the above teachings.

What is claimed is:
1. A test station, comprising, an air permeable light tight enclosure structure, stand structure with wide spreading legs for mounting said light tight enclosure structure thereabove, a wide spreading roof positioned on said light tight enclosure structure, means including pivot bolts centrally opposed on said light tight enclosure for pivotally attaching said light tight enclosure structure to said stand structure, and removable means including a securing bolt spaced from said pivot bolts for securing said light tight enclosure structure above said stand structure whereby when said removable securing means are removed, said light tight enclosure structure may be collapsed for portability by rotating about said pivot means to depend between said wide spreading legs of said stand structure and to accommodate said wide spreading roof.

2. A test station as recited in claim 1, wherein at least one side of said air permeable light tight enclosure is provided with a light baffle comprising, in section, an array of inverted Y-shaped elements.

3. A test station as recited in claim 1, wherein each side of said air permeable light tight enclosure is provided with a light baffle assembly.

4. A test station as recited in claim 3, wherein one of said light baffle assemblies is pivotally mounted to provide access to the interior of said enclosure structure.

5. A test station as recited in claim 1, wherein said test station has a substantially vertical side and said spreading roof for said enclosure structure is positioned at an angle other than ninety degrees with respect to said substantially vertical side to receive samples of specimens to be exposed.

6. A test station as recited in claim 1, and additionally a dust fall collector means positioned above said roof and secured thereto to collect samples of atmospheric dust.

7. A test station as recited in claim 1, and additionally a lead peroxide candle assembly for sulphate determination positioned above said roof and secured thereto.

8. A test station as recited in claim 1, and additionally means for attaching fabric samples to the upper side of said roof.

9. A test station as recited in claim 1, and additionally means secured to said roof for exposing test specimens to determine the effect of the atmosphere on said test specimens.

10. A test station as recited in claim 1, and additionally rack means positioned on the interior of said enclosure structure for evaluating the pollution effect of he atmosphere in the absence of sunlight.

References Cited
UNITED STATES PATENTS

| 2,652,722 | 9/1953 | Wood | 73—431 X |
| 2,837,916 | 6/1958 | Humphreys | 73—431 X |
| 3,216,246 | 11/1965 | Blondeau et al. | 73—170 |

FOREIGN PATENTS 809,127  7/1951  Germany.

LOUIS, R. PRINCE, *Primary Examiner.*

J. W. ROSKOS, *Assistant Examiner.*

U.S. Cl. X.R.

73—432